UNITED STATES PATENT OFFICE.

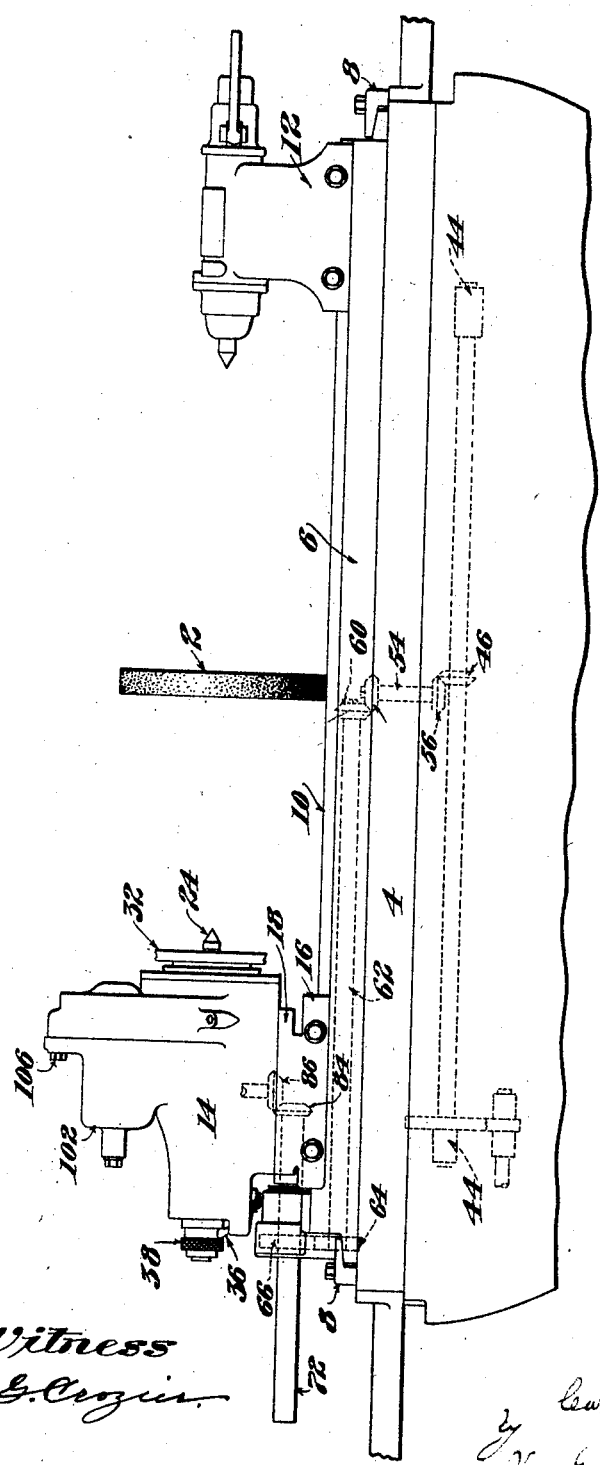

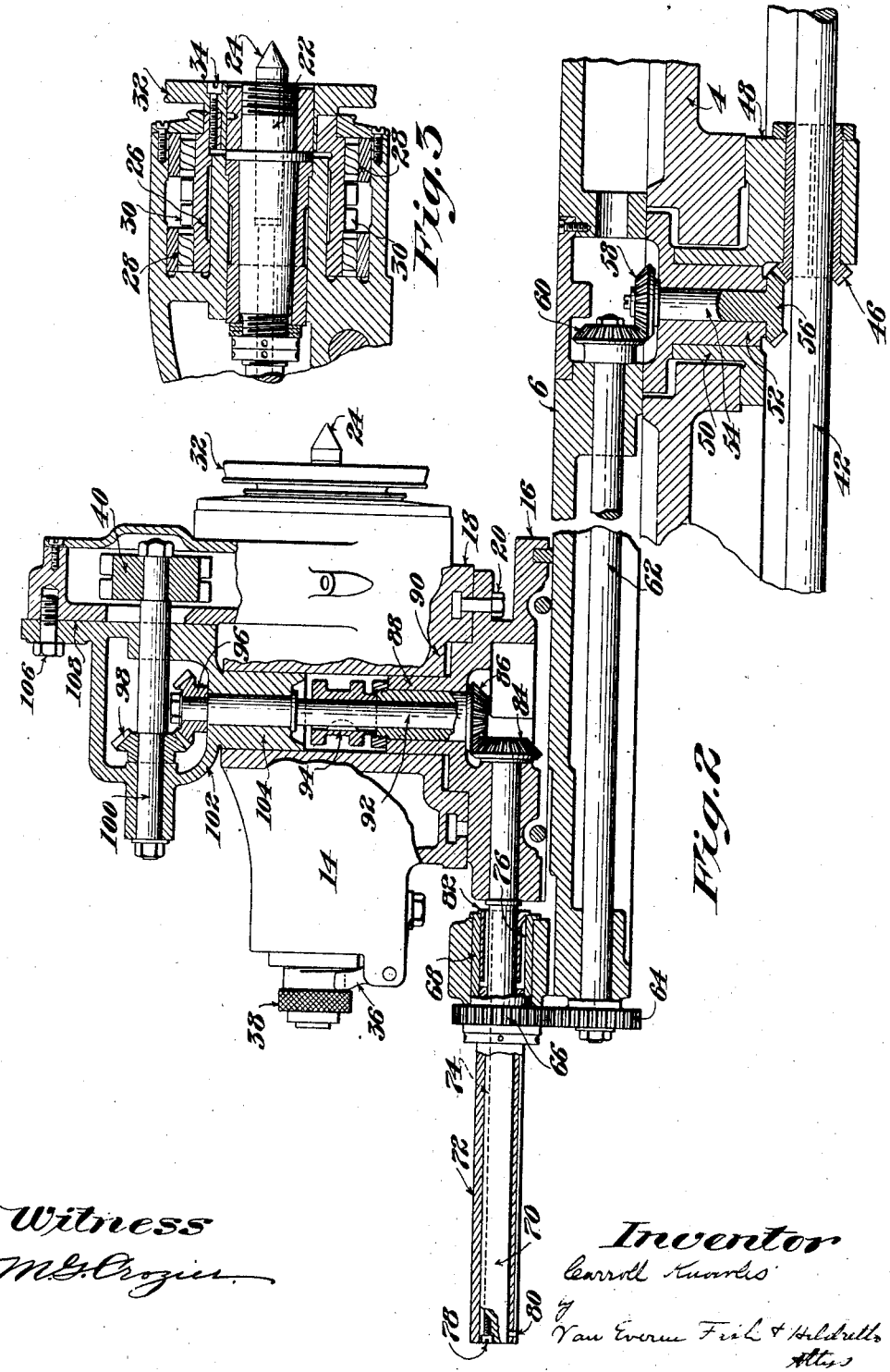

CARROLL KNOWLES, OF CRANSTON, RHODE ISLAND, ASSIGNOR TO BROWN AND SHARPE MANUFACTURING COMPANY, OF PROVIDENCE, RHODE ISLAND, A CORPORATION OF RHODE ISLAND.

GRINDING-MACHINE.

1,324,123.  Specification of Letters Patent.  Patented Dec. 9, 1919.

Application filed April 5, 1918. Serial No. 226,886.

*To all whom it may concern:*

Be it known that I, CARROLL KNOWLES, a citizen of the United States, residing at Cranston, in the county of Providence and State of Rhode Island, have invented certain new and useful Improvements in Grinding-Machines; and I do hereby declare the following to be a full, clear, and exact description of the invention, such as will enable others skilled in the art to which it appertains, to make and use the same.

The invention relates to that type of grinding machines in which the work is supported upon a reciprocating table and is rotated during its travel across the active face of the grinding wheel.

In machines of the above type, a rotary driver for rotating the work is mounted on a head stock longitudinally adjustable upon a swivel table, which is in turn adjustably mounted on a reciprocating or sliding table. In the case of a so-called "Universal" machine the head stock also comprises a swivel head carrying the driver and a base on which the head is adjustably secured. It is the object of the present invention to provide mechanism for driving the rotary work driver from below which is simple and compact, and which in its preferred form will not require slotting the reciprocating or swivel tables, with the consequent weakening of these parts, and opportunity for water and grit to pass therethrough, and which will minimize the space required for the reciprocation of the table and the connected parts.

To these ends motion is transmitted to the work driver on the head stock from a fixed driving shaft in the machine base through a driving train constructed and arranged to permit the travel of the reciprocating table, the adjustment of the swivel table on the reciprocating table, the adjustment of the head stock on the swivel table, and in the case of a universal head stock, to also permit the adjustment of its swivel head on the head stock base. The driving train preferably includes gearing arranged on the end of the swivel table, and connected with the fixed driving shaft by gearing passing through the axis about which the table is adjusted, and with that part of the train which is carried by the head stock, by extensible connections permitting the adjustment of the head stock. The train thus passes through the axis of the swivel table along the under side of the table to its end and thence along the upper side of the table to the head stock, thus avoiding slotting either the reciprocating or swivel tables.

The invention also contemplates so mounting the rotary work driver that lateral strains thereon will not tend to disturb the accurate alinement of the head stock spindle, or cause it to vibrate or chatter. To this end the driver rotates on an independent bearing which supports the strains to which the driver is subjected. This is of especial advantage in that it enables the flexible chain drive to be used without danger of affecting the spindle or subjecting it to unnecessary wear.

The various features of the invention will be readily understood from an inspection of the accompanying drawings and the following detailed description of the mechanism illustrated therein.

In the drawings, Figure 1 is a front elevation of so much of a universal grinding machine as is necessary to illustrate the application of the present invention thereto; Fig. 2 is a vertical sectional view through the head stock driving mechanism; and Fig. 3 is a horizontal sectional detail showing the manner of mounting the sprocket wheel which forms the work driver.

The machine shown in the drawings is provided with the rotary grinding wheel 2 which is mounted on the usual cross-feed slide, the reciprocating table 4, the swivel table 6 which is adjustably secured on the table 4 by the usual clamps 8, and is provided with longitudinal ways 10 on which the tail stock 12 and head stock 14 are adjustably secured. The head stock comprises the base 16 which is clamped in adjusted position on the ways 10, and a swivel head 18 mounted to turn on the base 16, and secured in adjusted position by the usual clamping bolts 20 (Fig. 2). The head stock spindle 22 (Fig. 3) is mounted in the head 18, and is adapted to carry one of the work supporting centers 24, or a work carrying chuck or face plate. The driver for rotating the work consists of a sleeve 26 surrounding the spindle bearing and supported in the roller bearings 28 which are arranged on opposite sides of the sprocket teeth 30 of the sleeve. The sprocket sleeve is thus supported independently of the spindle, and any strains to which the sprocket wheel is subjected are not transmitted to the spindle. A plate 32 is secured to the driving sleeve by screws 34, and carries a work engaging dog, in case the work is to rotate on the work supporting center, the spindle in such case being held from rotation by the engagement of the lock lever 36 with a slotted collar 38 on the rear end of the spindle. This plate may be removed and a plate screwed on to the end of the spindle which may be connected with the driving sleeve by the heads of the screws 34, in case the spindle and work supporting center are to rotate with the work, or in case the work is to be secured to and carried by the spindle, the locking lever 36 in this case being disengaged from the collar 38.

The driving sleeve is rotated through a sprocket chain passing over the sleeve and over a sprocket wheel 40 which is connected through a train of gearing with a driving shaft 42 mounted in fixed position in the bearings 44 in the machine base and extending longitudinally below the table. As shown in Fig. 2, this train of gearing in its preferred form comprises a bevel gear 46 arranged to slide on and be driven by the splined driving shaft 42, and mounted in a bearing bracket 48 which is secured to a boss on the under side of the sliding table 4. The bracket 48 is provided with a vertical bearing boss 50 extending up through a hole in the boss 4 and forming a bearing for the pivot bracket 52 which is secured to the under side of the swivel table 6 and fits within the boss 50. The bearing 50 and pivot 52 thus form the pivotal connection between the swivel table and the sliding table about which the swivel table is moved in adjusting it to suit the character of work to be done. The train of gearing through which motion is transmitted from the driving shaft 42 passes through the axis of this pivotal connection and comprises a shaft 54 fitting within a bearing in the center of the bracket 52 and provided at its lower end with a gear 56 engaging the gear 46. The upper end of the shaft 54 carries a bevel gear 58 which engages a similar gear 60 secured to the inner end of a horizontal shaft 62 which is mounted in bearings on the under side of the swivel table and extends to the head stock end of the table. At this end the shaft 62 is provided with a gear 64 which engages a similar gear 66 secured to a sleeve 68 which is mounted in a bearing above the upper surface of the swivel table. The sleeve 68 has a sliding driving connection with a horizontal shaft 70, the inner end of which is mounted in a bearing in the base of the head stock. In order to reduce the extent to which the shaft 70 will project beyond the end of the swivel table when the head stock is in its extreme adjusted position at the end of the table, the shaft is formed in telescoping sections As shown, the inner section is journaled in the head stock base, and is arranged to slide within the section 72, which is in turn mounted to slide within the sleeve 68. The inner section is connected with the sleeve by a key 74, and the outer section or sleeve 72 is connected with the sleeve 68 by a key 76. A stop screw 78 is secured in the end of the section 70 with its head projecting into the keyway for the key 74, so that the head of the screw will engage the end of the key and limit the movement of the section 70 within the sleeve 72. Inward movement of the sleeve 72 with relation to the sleeve 76 is limited by a stop pin 80 arranged at the outer end of the keyway for the key 76 and arranged to engage the end of the key. The outward movement of the sleeve 72 with relation to the sleeve 68 is limited by a flange 82 on the inner end of the sleeve 72. The telescoping shaft is one form of an extensible connection incorporated in the driving train which permits the adjustment of the head stock along the ways of the swivel table, and which does not unduly project beyond the end of the table when the head stock is in its extreme adjusted position.

In case the invention is embodied in a machine provided with a Universal head stock, as shown in the drawings, the driving train from the splined driving shaft 42 to the sprocket wheel 40 is arranged to pass through the axis about which the swivel head of the head stock is adjustable, so that the operation of the train will not be affected by the adjustment of the head. As shown, the shaft 70 is provided at its inner end with a bevel gear 84 engaging a bevel gear 86 which is mounted in a bearing boss 88 concentric with the pivotal bearing 90 about which the swivel head of the head stock is adjusted. The gear 86 surrounds a vertical shaft 92 to which the gear is normally connected by a clutch 94 keyed to the shaft and adapted to engage clutch teeth on the upper end of the gear hub. The clutch may be shifted to disconnect the work driving sprocket when desired. The upper end of the shaft 92 carries a bevel gear 96 which engages a similar gear 98 on the horizontal shaft 100, to the outer end of which the sprocket wheel 40 is secured. In order that the sprocket wheel 40 may be adjusted with relation to the work driving sprocket sleeve 26, the shaft 100 and the upper end of the shaft 92 are mounted in a vertically adjustable bracket 102 which is provided with a vertical bearing boss 104 fitting within a bearing in the head of the head stock. The bracket is secured in adjusted position by a clamping bolt 106 which clamps the side of the bracket against a bearing face 108 on the head of the head stock.

While it is preferred to employ substantially the construction and arrangement of parts shown and described, particularly in embodying the invention in a Universal milling machine, since this construction provides a simple and compact driving train which is effectively housed and protected, does not require slots or openings in the tables for the passage of water and grit, and does not interfere with the ready and convenient adjustment and movement of the parts, it will be understood that this construction and arrangement is not essential to the broader features of the invention, and may be varied or modified as found desirable or best suited to the construction and mode of operation of the machine in which it is to be embodied.

Having explained the nature and object of the invention, and specifically described one form of machine in which it may be embodied, what is claimed is:—

1. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, and a driving train of gearing for transmitting motion from the driving shaft to the work driver in all positions and adjustments of the parts.

2. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and the work driver including gearing at the end of the swivel table, and connections between the gearing and shaft passing through the axis about which the table is adjustable.

3. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and the work driver including gearing at the end of the swivel table, connections between the gearing and shaft passing through the axis about which the table is adjustable and extensible driving connections between the gearing and the head stock.

4. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and the work driver including gearing at the end of the swivel table connected with gearing passing through the axis of the table by a shaft on the under side of the table, and a shaft mounted in the head stock base and having a sliding connection with the gearing.

5. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and the work driver including gearing at the end of the swivel table, and a telescoping driving shaft between the gearing and head stock.

6. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and work driver including a gear mounted on the traveling table and having driving engagement with the shaft, a shaft mounted in the axis of the swivel table and driven from said gear, a horizontal shaft on the under side of the swivel table geared to the vertical shaft, gearing at the end of the swivel table driven by said horizontal shaft, a shaft mounted in the head stock base and having a sliding connection with the gearing at the end of the swivel table, and driving connections between said latter shaft and the work driver.

7. A grinding machine, having, in combination, a grinding wheel, a traveling work table, a swivel table mounted thereon, a head stock base adjustable longitudinally on the swivel table, a swivel head adjustable on the base, a rotary work driver in the swivel head, a longitudinal driving shaft mounted in fixed position below the tables, and a driving train of gearing for transmitting motion from the driving shaft to the work driver in all positions and adjustments of the parts.

8. A grinding machine, having, in combination, a grinding wheel, a traveling work table, a swivel table mounted thereon, a head stock adjustable longitudinally on the swivel table, a rotary work driver in the head stock, a longitudinal driving shaft mounted in fixed position below the tables, a driving train of gearing between the fixed shaft and the work driver including gearing at the end of the swivel table, connections between the gearing and shaft passing through the axis about which the table is adjustable, extensible driving connections between the gearing and the head stock, and connections arranged in the axis about the swivel head is adjusted for transmitting motion from said extensible connection to the work driver.

9. A grinding machine, having, in combination, a grinding wheel and work table, a head stock on the work table, a work supporting spindle in the head stock, and a concentric rotary work driver mounted in an independent bearing for supporting the strains to which the driver is subjected.

10. A grinding machine, having, in combination, a grinding wheel, a work table, a head stock on the work table, a work supporting spindle in the head stock, a concentric rotary work driver, and independent bearings for the spindle and work driver.

11. A grinding machine, having, in combination, a grinding wheel, a work table, a head stock on the work table, a spindle in the head stock, a sprocket sleeve surrounding the spindle, a bearing for supporting the sleeve independently of the spindle, and a sprocket chain for driving the sleeve.

CARROLL KNOWLES.